United States Patent

[11] 3,600,963

[72] Inventor August Thomas Portmann
Arbon, Thurgau, Switzerland
[21] Appl. No. 853,316
[22] Filed Aug. 27, 1969
[45] Patented Aug. 24, 1971
[73] Assignee Adolph Saurer Ltd.
Arbon, Thurgau, Switzerland
[32] Priority Sept. 11, 1968
[33] Switzerland
[31] 13567/68

[54] COUNTERSHAFT GEAR-SHIFT TRANSMISSION
10 Claims, 4 Drawing Figs.
[52] U.S. Cl. .................................................. 74/360,
74/359
[51] Int. Cl. .............................................. F16h 3/08,
F16h 5/16
[50] Field of Search ........................................... 74/359, 360

[56] References Cited
UNITED STATES PATENTS
2,181,460 11/1939 Meyer ........................ 74/359
2,246,636 6/1941 Peterson et al. ........... 74/359 X
2,269,215 1/1942 Maier ......................... 74/359
2,567,446 9/1951 Polomski .................... 74/359 X
2,857,772 10/1958 Garnier et al. ............. 74/359

3,115,047 12/1963 Lunn et al. .................... 74/360

Primary Examiner—William L. Freeh
Assistant Examiner—Thomas C. Perry
Attorney—McGlew and Toren ABSTRACT: A countershaft gear-shift transmission with constantly meshing gear pairs includes a drive shaft, a main shaft coaxial with the drive shaft and a countershaft parallel to the main and drive shafts. A first countershaft gear is fixed to rotate with the countershaft and a first main shaft gear is rotatable on the main shaft and constantly meshes with the first countershaft gear. An additional countershaft gear or gears are rotatably mounted on the countershaft and constantly mesh with gears rotatable on the drive shaft and on the main shaft. Shifting clutch means are operatively associated with the gears and are selectively operable to couple the first countershaft gear to the drive shaft through either the first main shaft gear or one or more of the additional countershaft gears. Operating means are provided for the shifting clutch means, and pneumatically actuated interlocking means are provided to assure proper operation of the operating means. The transmission may have eight forward speeds and two reverse speeds or may have 12 forward speeds and two reverse speeds. The reverse speed gearing includes a center gear and a ring gear meshing with at least one idler gear mounted between the center and ring gears.

Fig.1

POWER FLOW DIAGRAM

INVENTOR.
AUGUST THOMAS PORTMANN 3,600,963

1

COUNTERSHAFT GEAR-SHIFT TRANSMISSION

SUMMARY OF THE INVENTION

This invention relates to a countershaft gear-shift transmission with constantly meshing gear pairs and, more particularly, to an improved transmission of this type including novel actuating means providing for obtaining a wide range of speeds within a relatively compact space.

In accordance with the invention, the transmission includes a drive shaft and a main shaft which are coaxially aligned, and further includes a countershaft which extends parallel to the drive shaft and the main shaft. The countershaft carries several gears constantly meshing with gears provided on the main shaft and the drive shaft, and clutch means are provided to couple the drive shaft to the main shaft through gears on the main shaft and on the countershaft. The various constantly meshing gear pairs have different reduction ratios, so that either eight or twelve forward speeds may be provided and two reverse speeds. The reverse speed gearing is of a type including a center gear and a ring gear meshing with at least one idler gear mounted therebetween for compactness of the transmission.

A main shaft clutch and a countershaft clutch have operating or guide rings which are manually operable by a shifting lever movable in an H-shape template. A second main shaft clutch is operable by a differential piston responsive to certain movements of the shifting lever.

In the 12 forward speed arrangement, an additional countershaft clutch is provided and is also operated by a differential piston, the differential clutch and associated main and countershaft gears being supported in a cantilever fashion.

An object of the invention is to provide an improved countershaft gear-shift transmission with constantly meshing gear pairs.

A further object of the invention is to provide such 35 transmission in which only four gear pairs are required for eight forward speeds and only five gear pairs for 12 speeds.

A further object of the invention is to provide such a transmission in which the various elements may be housed in a compact manner in a small housing.

Another object of the invention is to provide such a transmission in which reversing gears and an associated shifting clutch are arranged on the countershaft.

A further object of the invention is to provide such a transmission including pneumatically actuated interlocking means preventing improper shifting of the gears.

For an understanding of the principles of the invention, reference is made to the following description of typical embodiments thereof as illustrated in the accompanying drawings.

DESCRIPTION OF THE PREFERRED EMBODIMENTS

Figure 1:
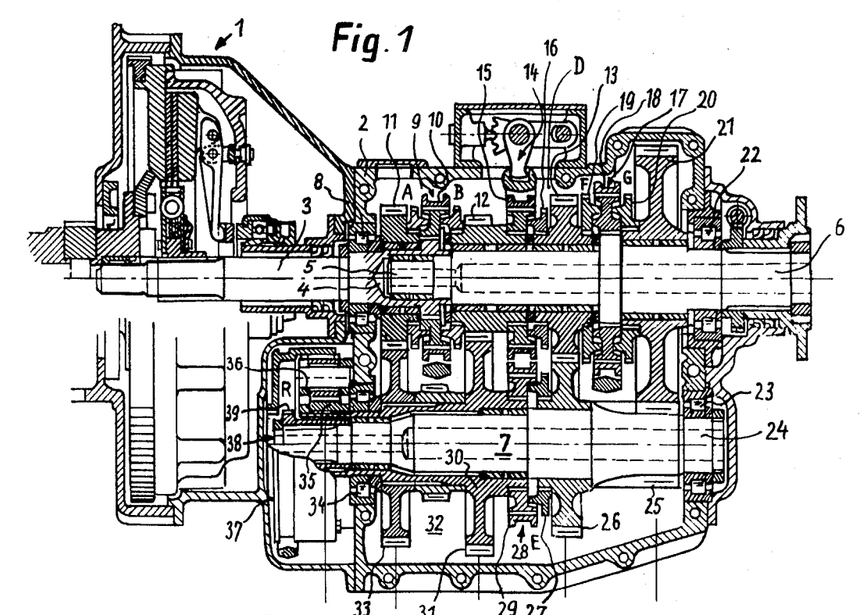
FIG. 1 is a longitudinal or axial sectional view of an 8-speed transmission and a corresponding power flow diagram.

Referring first to FIG. 1, a transmission housing 2 has a flanged connection to the clutch housing 1 of an automotive vehicle motor. A rotatably mounted drive shaft 3 projects into transmission housing 2 and its end in housing 2 is designed as a hollow or tubular drive shaft portion 4 which rotatably receives a plug or stub end 5 of a main shaft 6 which is coaxially aligned with drive shaft 3. A countershaft 7 is rotatably mounted in housing 2 in spaced parallel relation to drive shaft 3 and main shaft 6. Countershaft 7 carries several gears which are in constant mesh with gears on main shaft 6 and drive shaft 3, and the gears are capable of being coupled, with or without synchronization, mutually or with the respective shafts, by means of shifting clutches.

Where drive shaft 3 enters housing 2, it is mounted in a roller bearing 8 disposed in a wall of housing 2. The end of drive shaft 3 in housing 2 carries a shifting clutch 9, constituting a drive shaft clutch, and designed as a jaw clutch with which may be provided with synchronizing means. The guide or operating ring 10 of drive shaft clutch 9 is movable axially, and is either in a position A in which it couples a drive shaft gear 11, freely rotatable on drive shaft 3, so as to rotate with clutch 9, or in a position B in which it couples a gear 12, constituting a third main shaft gear, freely mounted on main shaft 6, so it will rotate with drive shaft 3. Drive shaft clutch 9 is shifted by a separate hand operated shifting lever which has not been shown in FIG. 1.

Third main shaft gear 12 can be coupled with a first main shaft gear 13, rotatably mounted on main shaft 6, by means of a main shaft shifting gear clutch 14 which may be provided with synchronizing means. Operation of clutch 14 is effected by a ring 15 which seats on a tooth ring integral with or fixedly attached to third main shaft gear 12 and merely indicated in FIG 1. Ring 15 is shiftable axially into a position D in which it engages a gear rim 16 secured to or integral with first main shaft gear 13.

A main shaft clutch 17, which may be provided with synchronizing means, is provided to connect first main shaft gear 13 with main shaft 6 for conjoint rotation. For this purpose, clutch 17 is mounted on a gear rim on main shaft 6, and includes an operating ring 18 which is movable axially into a position F wherein it engages a gear rim 19 on first main shaft gear 13.

Ring 18 of clutch 17 is movable in the axially opposite direction into a position G where it is in engagement with a gear rim 20 fixedly secured to a second main shaft gear 21 which is rotatably mounted on main shaft 6. Consequently, main shaft clutch 17, in position G couples second main shaft gear 21 and main shaft 6 for conjoint rotation. Outwardly of second main shaft gear 21, main shaft 6 is mounted in a roller bearing 22 seated in a wall of housing 2, shaft sealing members being provided at this location for preventing loss of lubricant.

Another roller bearing 23 is mounted in this wall, namely the right wall, of transmission housing 2, and supports a journal 24 of countershaft 7. Adjacent journal 24, there is a second countershaft gear 25 which is integral with countershaft 7 and meshes with second main shaft gear 21. Adjacent gear 25 is a first countershaft gear 26 which is also fixed to rotate with countershaft 7 and constantly meshes with first main shaft gear 13. On its side facing away from second countershaft gear 25, first countershaft gear 26 has a gear rim 27 of a countershaft clutch 28 which may be provided with synchronizing means. A clutch ring 29 may be moved into a position E in which it is engaged with gear rim 27 in order to couple first countershaft gear 26 to rotate conjointly with a tubular or hollow shaft 30 rotatably mounted on countershaft 7.

Adjacent countershaft clutch 28, a third countershaft gear 31 is formed as part of tubular shaft 30, and constantly meshes with third main shaft gear 12. Also rotatable with hollow shaft 30 are an oil pump gear 32 and a fourth countershaft gear 33. Oil pump gear 32 adjoins third countershaft gear 31, and is intended to operate an oil pump which has not been shown. Fourth countershaft gear 33 adjoins oil pump gear 32 and meshes constantly with drive shaft gear 11. On the side of fourth countershaft gear 33 facing away from oil pump gear 32, a roller bearing 34 is mounted on hollow or tubular shaft 30 and is seated in the adjacent wall of transmission housing 2.

On the opposite side of bearing 34, and adjacent the inner bearing race, there is a reverse gear 35 which rotates conjointly with hollow or tubular shaft 30 and is in constant engagement with several pinions 36, of which only one can be seen in FIG. 1. These pinions are disposed around hollow or tubular shaft 30 and are rotatably mounted on respective pins secured to the wall of housing 2. In turn, pinions 36 mesh with an internal ring gear 37 mounted so as to be movable axially. The central area of gear 37 is designed as the coupling ring of the shifting reversing clutch 38, and this coupling ring, by movement axially into a position $R$, can engage a gear rim 39 rotatable conjointly with countershaft 7 and adjoining the free end of tubular shaft 30. This couples gear 37 to rotate conjointly with countershaft 7. A cup-shaped cover, secured to transmission housing 2 and forming part of clutch housing 1, protects gear 37, reversing clutch 39 and pinions 36 against external influences and loss of lubricant.

The transmission illustrated in FIG. 1 makes possible the selection of eight forward speeds and two reverse speeds. The positions of the various shifting clutches 9, 14, 17 and 28, in the respective speeds, may be seen from the power flow diagram of FIG. 1. In this diagram, the horizontal lines indicate the components of the various shafts 3, 6 and 7 under load in the respective speeds, while the vertical lines indicate the gear pairs which are under load. The gear ratios of the various gear pairs are shown in the horizontal row entitled "gear ratio"; while a vertical column marked "speed reduction" indicates the ratio of the various speeds. In another column, the main speeds are indicated by arabic numerals or by $R$. Since, as will be explained hereinafter, an intermediate shifting device is interposed in the transmission, each of the main speeds is divided into two intermediate speeds, which are indicated by arabic numerals with an index.

Thus, when the first speed is selected, for example, drive shaft clutch 9 is in its $B$ position in accordance with the diagram, and connects drive shaft 3 with third main shaft gear 12. The latter, through third countershaft gear 31, is in driving connection with tubular shaft 30 which, again in accordance with the diagram, is coupled with countershaft 7 by countershaft clutch 28 in its $E$ position. Countershaft 7 drives, through second countershaft gear 25, second main shaft gear 21 which, as illustrated in the power flow diagram, is coupled by main shaft clutch 17, in its position $G$ to main shaft 6 so as to rotate conjointly with the latter in driving connection therewith.

With the assistance of the power flow diagram, the shifting clutch positions of the other forward speeds may be determined analogously. The 7-speed is a so-called "direct speed" and the 8-speed is an overdrive.

When shifting into reverse, tubular shaft 30 is coupled with drive shaft 3 through drive shaft clutch 9. Pinions 36 drive internal ring gear 37 in a direction opposite to the direction of rotation of tubular shaft 30. In its effective $R$ position, reversing clutch 38 connects gear 37 to rotate conjointly with countershaft 7, so that pinions 36 and internal ring gear 37 effect a reversal of the rotational direction of countershaft 7. Countershaft 7 drives, through second countershaft gear 25, second main shaft gear 21 which rotates conjointly with main shaft 6 through main shaft clutch 17 in its position $G$.

Figure 2:
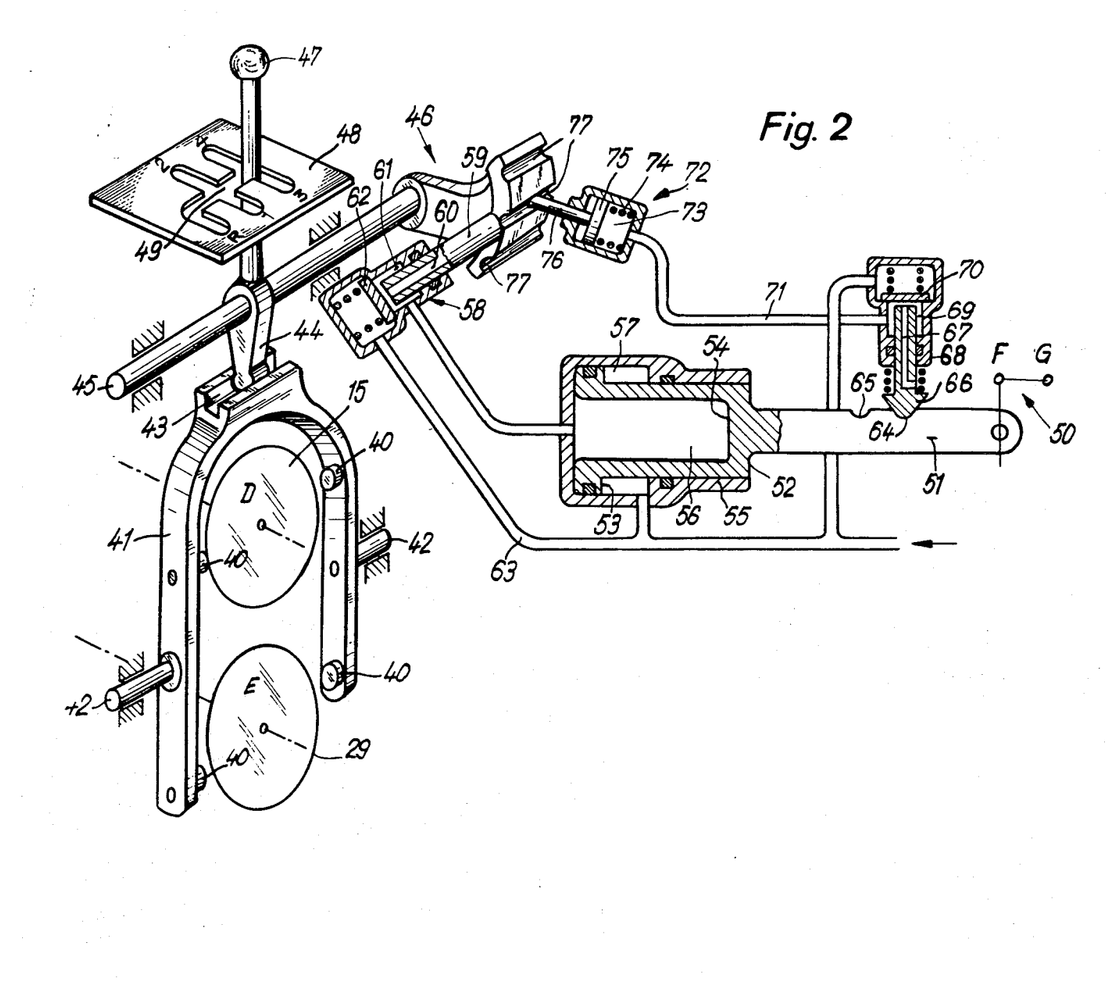
FIG. 2 is a somewhat schematic and partial perspective view of components for actuating shifting clutches in the transmission shown in FIG. 1.

Referring now to FIG. 2, this figure schematically illustrates the operating members for shifting the main shaft gear clutch 14, the main shaft clutch 17 and countershaft clutch 28. In FIG. 2, the operating ring 15 of main shaft gear clutch 14 is indicated schematically by a circle, and the operating ring 29 of countershaft clutch 28 is indicated by a circle. The external groove of each ring 15 or 29 is engaged by two cams or pins 40 on the arms of a double shifting fork 41, the cams 40 being diametrically opposed and the fork enclosing rings 15 and 29. Between the cams 40 on each fork arm, there is secured a bearing pin 42, which extends outwardly, and these bearing pins are inserted into matching bearing sleeves in transmission housing 2 so that shifting fork 41 can pivot.

At the bight of fork 41, there is a groove 43 which extends parallel to bearing pins 42 and opens outwardly to receive a shifting finger 44 on a shifting shaft 45 which is mounted in transmission housing 2 so as to be both rotatable and axially movable. Extending in the opposite direction from shifting shaft 45, and at the location of shifting finger 44, there is a manual shifting lever 47 which extends through a shifting template 48 designed for an $H$ shifting pattern.

When shifting lever 47 is in the cross slot 49 of shifting template 48, main shaft gear clutch 14, as well as countershaft gear clutch 28, are in their disengaged position, as shown in FIG 1. If now shift lever 47 is moved into either the second or the fourth speed positions in accordance with shifting template 48, shifting finger 44 pivots shifting fork 41 about bearing pins 42 so that main shaft gear clutch 14 is moved into its effective position $D$ whereas the ring 29 of countershaft clutch 28 continues to be pushed against the third countershaft gear 31 secured on hollow or tubular shaft 30, and thus remains disengaged. However, when shift lever 41 is moved into either the first or third speeds in accordance with shifting template 48, shifting finger 44 pivots shifting fork 41 in the opposite angular direction so that, analogously, main shaft clutch 14 remains disengaged but countershaft clutch 28 is moved into its effective $E$ position.

As somewhat schematically indicated at 50 in FIG. 2, ring 18 of main shaft clutch 17 is in mechanical driving connection with the piston rod 51 secured to a differential piston 52 which has two active areas 53 and 54 of different size. Piston 52 is movable in a cylinder 55, and divides the cylinder into two pressure chambers 56 and 57. Pressure chamber 57, having the smaller active area 53, is in direct flow connection with a compress air source which has not been illustrated, while the other pressure chamber 56 is connected to this source through a valve 58.

Valve 58 includes a movably guided valve stem 59 with a venting aperture 60 extending essentially axially of stem 59. Stem 59 terminates in a valve chamber 61 which communicates with pressure chamber 56, and stem 59 can also be caused to move axially against a valve plate 62 which rests on a valve seat and, in this position interrupts connection of compressed air supply line 63 to valve chamber 61. Valve stem 59 is located in the range of axial movement of an arm 46 extending radially from shifting shaft 45.

As illustrated in FIG. 2, manual shifting lever 47 is positioned in cross slot 49 between the third and fourth speed positions. Valve stem 59 is disengaged from valve plate 62, and pressure chamber 56, with the larger active area 54, is vented, whereas the other pressure chamber 57 is under pressure so that piston 52 is in the corresponding end position. In this position of piston 52, main shaft clutch 17 assumes its $F$ position.

When manual shifting lever 47 is pushed along cross slot 49 toward the shifting slots for the first and second speeds, shifting finger 44 follows longitudinal groove 43 of shifting fork 41, and arm 46 of shifting shaft 45 causes valve stem 59 to engage valve plate 62 and lift the latter off its valve seat. This interrupts the venting line of pressure chamber 56, having a larger active area 54, and establishes a connection between chamber 56 and the compressed air source, through line 63. The same pressure is now effective on both ends of piston 52 but, due to the active areas 53 and 54 being of different magnitude, piston 52 is moved into its other end position, or to the right. This operates main shaft clutch 17 into its $G$ position, in which second main shaft gear 21 rotates conjointly with main shaft 6. As can be seen in the power flow diagram of FIG. 1, main shaft clutch 17 assumes its $G$ position when the transmission is shifted into either the first or second forward speed or into reverse.

Referring again to FIG. 2, two notches 64 and 65 are formed in piston rod 51, and are spaced in accordance with the axial distance travelled by clutch ring 18 when main shaft clutch 17 changes from its $F$ position into its $G$ position. A spring-loaded valve stem 66 is engageable with these notches, and has an axially extending venting aperture 67 and extends into a valve housing 68 where it terminates in a valve chamber 69. Chamber 69 is closed off against the interior of the valve by a spring-loaded valve plate 70 which interrupts communication with the supply of compressed air from the compressed air source, and against which valve stem 66 can be caused to abut. Through a line 71, valve chamber 69 is in communication with a pneumatic piston device 72 including a pressure chamber 73 in which a piston 75, biased by a spring 74, is movably disposed. Piston 75 carries a piston rod 76 extending from device 72 and engaging one of the three longitudinal grooves 77 which are formed in arm 46 and extend parallel to the shifting shaft 45.

In the position of the parts illustrated in FIG. 2, stem 66 is disengaged from valve plate 70 and valve chamber 69 is vented. As a consequence, only the bias of spring 74 is effective on piston 75, so that shifting shaft 45 can be actuated by overcoming the force of spring 74 so that the transmission can be shifted into either the third speed or the fourth speed. However, if shifting lever 47 is moved along cross slot 49 into alignment with the slots for the first and second speeds, then piston rod 51 of differential piston 52 moves longitudinally with the result that valve stem 66 disengages notch 64 of rod 51 and is lifted. This causes valve stem 66 to engage valve plate 70 and lift this plate from its valve seat. Venting of valve chamber 69 thus is interrupted, and the chamber is now in communication with the source of compressed air. The pressure from this source now acts upon working piston 75 of pneumatic piston device 72, locking piston rod 76 in the then engaged longitudinal groove of arm 46. This makes it impossible to operate double-shifting fork 41 as long as pneumatic piston device 72 is under pressure, or as long as differential piston 52 is not in an end position in which main shaft clutch 17 assumed one of its positions $F$ or $G$. It is only when main shaft clutch 17 is in one of its positions $F$ or $G$, that valve stem 66 engages one of the notches 64 or 65 of piston rod 51 to thereby effect venting or unlocking of pneumatic piston device 72. In other words, manual shifting lever 47 can be introduced into a shifting slot only when main shaft clutch 17 is in either its $G$ position or its $F$ position.

Drive shaft clutch 9 in operating connection, either mechanical or pneumatic, with a separate actuating member which has not been shown and by means of which this clutch can be shifted either into its $A$ position or its $B$ position. The shifting of this clutch between its $A$ and $B$ positions makes it possible to shift into an intermediate speed in which countershaft 7 may be driven selectively through either the third countershaft gear 31 or the fourth countershaft gear 33, as indicated in the power flow diagram of FIG. 1.

Shifting shaft 45 is also in operating connection with reversing clutch 38, although this connection has not been shown in detail. The connection may be mechanical, for example, or may be effected by means of a control valve and a working cylinder. If manual shifting lever 47 is now moved in cross slot 49 of template 48 to abut against the left end of slot 49 adjacent the shifting slot for the reverse speed, shifting finger 44 disengages the longitudinal groove 43 of double shifting fork 41. When shifting lever 47 is moved into the reverse shifting slot, the operating connection effects movement of internal ring gear 37 into the $R$ position in which it engages rim gear 39 on countershaft 7.

Figure 3:
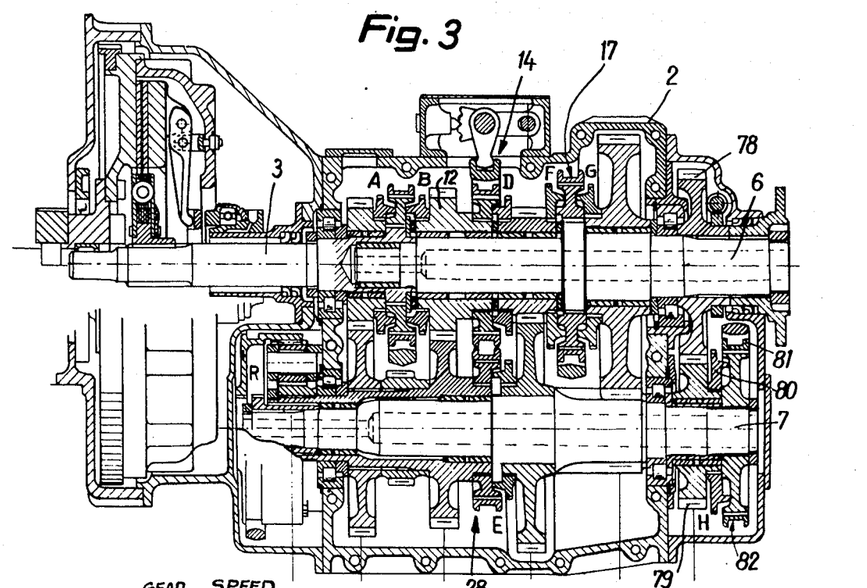
FIG. 3 is a longitudinal or axial sectional view of a 12-speed transmission and a corresponding power flow diagram.

Referring now to FIG. 3, the embodiment of the invention illustrated therein is a 12-speed transmission with two reverse speeds and whose basic design corresponds throughout to that of the transmission shown in FIG. 1. Drive shaft 3, countershaft 7 and main shaft 6 are mounted in a manner identical with the mounting in FIG. 1, and they support the same gears and shifting clutches, so that it will not be necessary to describe again this part of the transmission in detail, the same reference symbols being used for the same components in both Fig. 1 and FIG. 3.

In the transmission shown in FIG. 3, another gear 78, hereinafter called the fourth main shaft gear, is fixed to main shaft 6, to rotate conjointly therewith, at the free end of main shaft 6 and outside housing 2. Gear 78 meshes with a gear 79, hereinafter called the fourth countershaft gear, which is rotatably mounted on countershaft 7, likewise outside housing 2. On its end facing away from housing 2, gear 79 carries a rim gear 80 which can be engaged by an axially movable clutch ring 81 of a shifting clutch 82, hereinafter called the additional countershaft clutch. In the $H$ position of ring 81, fourth countershaft gear 79 is coupled to countershaft 7 to rotate conjointly therewith.

FIG. 3 also includes a power flow diagram illustrating the positions of the various clutches in the various main and intermediate speeds, as well as the exemplarily selected gear ratios of the various speeds and of the various gear pairs. From the flow diagram of FIG. 3, it will be noted that, due to the provision of the additional gear pair 78–79 and the additional countershaft clutch 82, the two addition main speeds "3" and "4" and, by virtue of the interposed intermediate speed shift, the intermediate speeds 5*–8*, may be selected.

Figure 4:
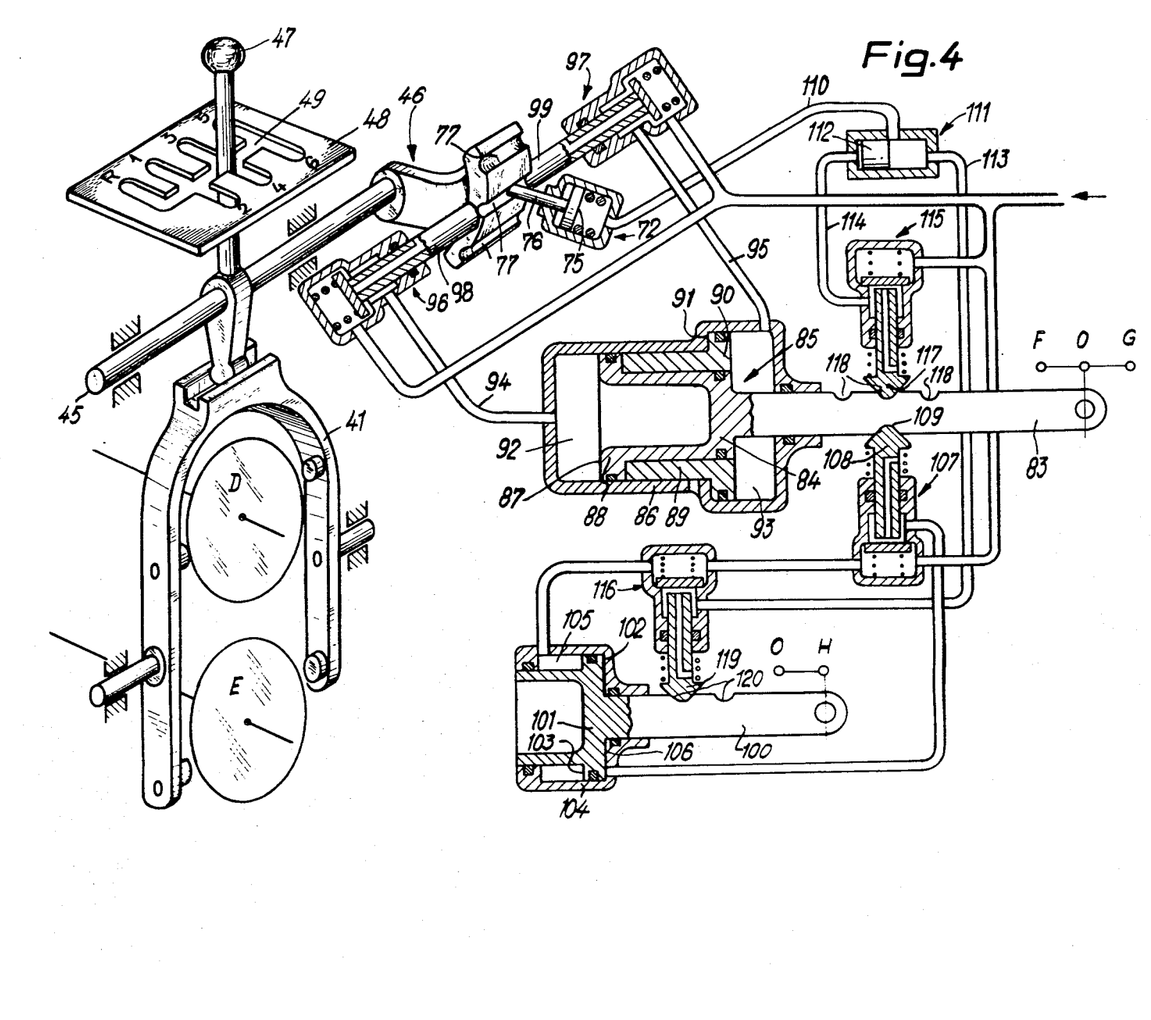
FIG. 4 is a somewhat schematic and partially perspective view of components for actuating the shifting clutches of the transmission shown in FIG. 3.

FIG. 4 illustrates, somewhat schematically, the arrangement of the components for actuating the clutches of the 12-speed transmission shown in FIG. 3. The actuating arrangements for main shaft gear clutch 14 and countershaft clutch 28 are identical with the actuating means therefor shown in FIG. 2. Thus, there is again provided a pivoted double-shifting fork 41 connected with the operating rings of these clutches and operated through shifting shaft 45 by shifting of manual shifting lever 47 into the shifting slots, for the forward speeds, and formed in shifting template 48. This effects a selective shifting of main shaft gear clutch 14 or countershaft clutch 28 into the engaged positions $d$ or $E$, respectively.

Referring to the power flow diagram of FIG. 3, it will be noted that main shaft clutch 17 assumes, in speeds 5 through 8, its third and ineffective shifting position which, in the transmission of FIG. 3, has been provided in addition to the effective positions $F$ and $G$ of clutch 17. As in FIG. 2, a piston rod 83 is in mechanical driving connection with ring 18 of main shaft clutch 17. In the arrangement of FIG. 4, piston rod 83 is secured to the inner piston element 84 of a two-part differential piston 85 and which is sealingly and movably disposed in a closed cylinder 86. One active area of differential piston 85 is formed by the free face 87 of inner piston element 84, whose peripheral area is designed as an annular flange 88.

As illustrated in FIG. 4, an annular outer piston element 89 is engaged with flange 88 and is sealingly guided by inner piston element 84. Outer piston element 89, on the end opposite to the end engaging annular flange 87, is formed with an annular flange 90. In the position of the parts illustrated in Fig. 4, flange 90 engages a circular shoulder 91 formed in the inner wall of cylinder 86, so that the first active area 87 of one pressure chamber 92, namely the inner piston pressure chamber, and formed by the inner piston element alone, is smaller than the active piston area of the other pressure chamber 93, which is an annular piston chamber, and which latter active area is formed by the end faces of piston elements 84 and 89.

Pressure chambers 92 and 93 are connected by respective lines 94 and 95 to valves 96 and 97, respectively. These valves are in communication with the compressed air source, and have the same design as the valve 58 of FIG. 2. Valves 96 and 97 are arranged at opposite end faces of shifting lever shaft arm 46 which can be caused, by moving shifting lever shaft 45 axially, to abut against one of the valve stems 98 or 99. In the position of the parts illustrated in FIG. 4, the valve plates of both valves 96 and 97 are lifted off their seats, so that pressure chambers 92 and 93 are in communication with the compressed air source.

In the position of the parts illustrated in FIG. 4, manual shifting lever 47 is in cross slot 49 of template 48 and in alignment with the slots for the third and fourth speeds, with both pressure chambers 92 and 93 being under pressure. By virtue of the pressure in annular piston chamber 93, annular piston 89 is pushed against shoulder 91 in the medium stroke area, whereas inner piston element ment 84, due to the pressure in chamber 92, is also moved into the medium stroke area so that its annular flange flange 88 abuts against the adjacent end of outer piston element 89. This causes piston rod 83 to assume its medium position, and main shaft clutch 17 is disengaged and in its ineffective position.

If manual shifting lever 47 is pushed along cross slot 49 toward the slots for the fifth and sixth speeds, shifting shaft arm 46 removes the pressure from the outer end of stem 98 of valve 96 so that inner piston pressure chamber 92 is vented. Under the effect of the greater pressure in annular piston pressure chamber 93, inner piston element 84 is moved further into inner piston pressure chamber 92, thereby bringing main shaft clutch 17 into its F position. On the contrary, if manual shifting lever 47 is moved in cross slot 49 toward the shifting slots for the first and second speeds, the pressure is removed from the stem 99 of the valve 97 so that the annular piston pressure chamber 93 is vented, causing piston rod 83 to be moved in the opposite direction and main shaft clutch 17 to assume its G position.

In order to actuate additional countershaft clutch 82, a piston rod 100 is mechanically connected with the operating ring 81, and is secured to a differential piston 101 hAVING two active areas, 102 and 103, of different sizes, piston 101 being movably disposed in a working cylinder 104. The cylinder pressure chamber 105 having the smaller active area 103 is in constant communication with the compressed air source, whereas the pressure chamber 106 with the larger active piston area 102 is connected to the compressed air source through a valve 107 whose design is identical with that of valve 66–70 of FIG. 2. Stem 108 of valve 107 abuts against piston rod 83 of the two-part differential piston 85, PIston rod 83 has a notch 109 in which there is engaged, in the position of the parts illustrated in FIG. 4, stem 108 when main shaft clutch 17 assumes its ineffective position O. Under these conditions, valve 107 is closed and pressure chamber 106, with the larger active area 102, is vented. The pressure prevailing in chamber 105 acts upon the other active area 103 of piston 101, so that this differential piston is in the illustrated end position and additional countershaft clutch 82 is engaged in its effective H position.

As soon as two-part differential piston 85 is moved, valve stem 108 disengages notch 109 in piston rod 83, thereby establishing communication between pressure chamber 106, with the larger active piston area 102, and the compressed air source. Since the same pressure acts upon both active areas 102 and 103, and as these areas differ in size, differential piston 101 moves to the left into its other end position and causes additional countershaft clutch 83 to assume its disengaged position.

When two-part differential piston 105 again reaches its medium position, corresponding to the disengaged position of main shaft clutch 17, stem 108 reengages notch 109 in piston rod 83, thereby venting pressure chamber 106 having the larger active piston area 102. Under the pressure existing in the other pressure camber 105, piston 101 is moved to the right to the illustrated position and in which additional countershaft clutch 82 is in its engaged position H. Consequently, main shaft clutch 17 and additional countershaft clutch 82 are never engaged simultaneously, which simultaneous engagement must be prevented in any event, if only for design reasons, as shown in FIG. 3.

In the embodiment of the invention shown in Figs. 3 and 4, there is also provided the locking device preventing actuation of shifting fork 41 as long as clutches 17 and 82 are in intermediate positions. For this purpose, three longitudinal grooves 77 are formed in shifting shaft arm 46 and, in the position of the parts shown in FIG. 4, stem 76 of a flocking piston 75 engages the middle one of these grooves 77. Locking piston 75 forms part of a controlling device 72 corresponding to the one described in greater detail with reference to FIG. 2. A line 110 extends from pneumatic locking device 72 into the central area of a horizontal cylindrical container which is designed as an adjusting valve 111 and in which a free piston 102 is guided. Lines 113 and 114 lead from respective opposite ends of valve 111 to valves 115 and 116, respectively. Valves 115 and 116 control connection of the compressed air source to locking devices 117 and 119, respectively, and these locking devices are designed in the same manner as the valve 66–70 of FIG. 2.

Stem 117 of valve 115 engages piston rod 83 of differential piston 85. This rod 83 has three notches 118 spaced apart so as to be in the F, the O and the G positions of ring 18 of main shaft clutch 17. In the position of the parts illustrated in Fig. 4, stem 117 engages the middle notch, main shaft clutch 17 being in its disengaged position. If rod 83 of two-part differential pistons 85 in now moved longitudinally, stem 117 of valve 15 disengages center notch 118.

Stem 119 of valve 116 engages piston rod 100 of differential piston 101 and, in the position of the part shown in FIG. 4, it is engaged with one of the two notches 120 in piston rod 100. These notches are spaced in accordance with the spacing of the end positions of ring 81 of addition countershaft clutch 82 which, in the position illustrated in FIG. 4, is in its H position. In this position of stem 119, the right-hand chamber of adjusting valve 111, and therefore pneumatic piston device 72, are vented through lines 13 and 110.

Adjusting valve 111 is connected to the compressed air source through line 114. Free piston 112 of adjusting valve 111 is moved, by the resulting air pressure, into its opposite end position, interrupting venting of pneumatic device 72 through lines 113 and 110. Piston device 72 is subjected to the pressure air through lines 110 aNd 114, so that it locks shifting shaft 45 against rotation.

If piston rod 100 is moved longitudinally to shift additional countershaft clutch 82, stem !119 disengages notch 120 thereby interrupting venting of the chamber of valve 116. This chamber is thus placed in communication with the compressed air source, so that free piston 112 in the chamber of adjusting valve 111 is moved into its left-hand end position establishing communication between pneumatic piston device 72 and the compressed air source. This relocks shifting shaft 45 as long as stem 119 is disengaged from a notch 120, or as long as additional countershaft clutch 82 is in an intermediate position.

The valves 115 and 116, which control pneumatic piston device 72, thus have the effect that manual shifting lever 47 cannot be shifted into a shifting slot, and main shaft clutch 14, as well as countershaft clutch 28, cannot be actuated, as long as main shaft clutch 17 and additional countershaft clutch 82, or one of these two clutches, are not in a predetermined shifting position.

Shifting into intermediate speeds of the shifting group A–B, B, as well as shifting into reverse, are again accomplished by means of separating actuating members as discussed in detail in connection with the transmission of FIGS. 1 and 2.

In the invention transmission, only four gear pairs are used advantageously for 8 speeds, and only five gear pairs for 12 speeds, the last gear pair 78—79 being cantilevered so that the axial spacing of the bearings for the drive shaft and the main shaft, as well as the axial spacing of the bearings for the countershaft, are short, Therefore, two bearings for the drive shaft-main shaft and two bearings for the countershaft are sufficient, and the housing 2 thus is enabled to have a compact shape.

Due to the fact that the shifting clutch for the fourth main shaft gear and the corresponding countershaft gear are cantilevered, housing 2 can further be shortened advantageously between its input flange and its output flange. However, since the housing has no supporting function for the gear pair 78—79, it may be of light construction. As the transmission is functionally separated in advance of the first main shaft gear and the first countershaft gear, the energy necessary to be expended for synchronization during the various shifting motions becomes relatively small in an advantageous manner.

Another advantage of the transmission is that the fourth main shaft gear 78 rotates conjointly with main shaft 6, so that it can be utilized as an outside drive with its speed being proportional to the vehicle speed. Such a drive is suitable for the operation of a fluid brake.

As reversing gears 35-37 and the corresponding clutch 38 are disposed at the countershaft 7 in an advantageous manner, this obviates the necessity of a third shaft, so that the transmission is characterized by relatively small lateral dimensions. In addition, this arrangement results, in practice, in no greater transmission length, because the structural length required for the components to actuate the clutch in housing 1 is utilized, and clutch housing 1 simultaneously accommodates gears 35-37.

Any pressure medium, such as hydraulic fluid, may be used instead of compressed air to actuate the various clutches.

While the described transmissions include manual shifting levers for actuation of the drive shaft clutch and of the main shaft gear clutch and countershaft clutch, the transmission also may be designed as automatic transmissions.

I claim:

1. A countershaft gear-shift transmission with constantly meshing gear pairs comprising, in combination, a transmission housing; a drive shaft; a main shaft; a countershaft; means rotatably mounting said shafts in said housing with said countershaft in spaced parallel relation to said drive shaft and said main shaft; and hollow shaft rotatably mounted on said countershaft; a first countershaft gear fixed to rotate with said countershaft; a first main shaft gear rotatable on said main shaft and constantly meshing with said first countershaft gear; a second countershaft gear conjointly rotatably with said countershaft; a second main shaft gear constantly meshing with such second countershaft gear and rotatably mounted on said main shaft; third and fourth countershaft gears fixedly mounted on said hollow shaft to rotate therewith; a third main shaft gear rotatably mounted on said main shaft and constantly meshing with said third countershaft gear; a drive shaft gear rotatably mounted on said drive shaft and constantly meshing with said fourth countershaft gear; shifting clutch means operatively associated with said gears, and including a main shaft shifting clutch selectively operable to couple one of said first and second main shaft gears with said main shaft to rotate conjointly with said main shaft, a drive shaft clutch fixed to said drive shaft and selectively operable to couple one of said drive shaft gear and said third main shaft gear with said drive shaft to rotate conjointly with said drive shaft, a main shaft gear clutch selectively operable to couple said first main shaft gear with said third main shaft gear, and a countershaft clutch operable to couple said first countershaft gear with said hollow shaft; and operating means for said shifting clutch means.

2. A countershaft gear-shift transmission, as claimed in claim 1, including a spur gear fixed to that end of said hollow shaft remote from said first countershaft gear for rotation with said hollow shaft; at least one pinion rotatably mounted in said housing and constantly meshing with said spur gear; and an internal ring gear constantly meshing with said pinion, said shifting clutch means including a shifting clutch selectively operable to couple said internal ring gear with said countershaft for conjoint rotation with said countershaft.

3. A countershaft gear-shift transmission, as claimed in claim 1, in which said main shaft gear clutch and said countershaft clutch are of gear tooth design; a double shifting fork operable to actuate selectively both said main shaft gear clutch and said countershaft clutch; a shifting shaft rotatably mounted in said housing and movable axially; a manual shifting lever connected to said shifting shaft; said shifting shaft being operatively connected to said double shifting fork to effect selectively engagement of either said main shaft gear clutch or said countershaft gear clutch; said manual shifting lever being movable in a shifting template having shifting slots for the respective speeds; a fluid pressure actuator connected to said main shaft clutch to shift said main shaft clutch; a fluid pressure operable valve controlling said fluid pressure actuator; and means operatively associated with said manual shifting lever and operably, responsive to movement of said manual shifting lever, transversely of the speed selecting slots, to operate said valve.

4. A countershaft gear-shift transmission, as claimed in claim 2, including two roller bearings supporting said countershaft in said transmission housing; one of said roller bearings being adjacent said second countershaft gear on the side thereof remote from said first countershaft gear, and the other of said roller bearings being positioned between said spur gear and said fourth countershaft gear.

5. A countershaft gear-shift transmission, as claimed in claim 1, in which said drive shaft and said main shaft are coaxial, and said drive shaft having, at its end adjacent said main shaft, a cylindrical recess rotatably receiving a cylindrical extension on said main shaft; and two roller bearings conjointly supporting said drive shaft and said main shaft in said transmission housing, one of said roller bearings adjoining said drive shaft gear on the side thereof remote from said main shaft, and the other of said roller bearings adjoining said second main shaft gear on the side thereof remote from said drive shaft.

6. A countershaft gear-shift transmission, as claimed in claim 1, including a spur gear fixed on said hollow shaft to rotate therewith and positioned between said third and fourth countershaft gears, said spur gear constituting an oil pump driving gear.

7. A countershaft gear-shift transmission, as claimed in claim 1, including a fifth countershaft gear rotatably mounted on said countershaft; a fourth main shaft gear constantly meshing with said fifth countershaft gear and rotatable conjointly with said main shaft; said main shaft shifting clutch being between said first and second main shaft gears and shiftable selectively between an ineffective position and either of two effective positions, said main shaft shifting clutch, in one effective position, coupling said first main shaft gear to said main shaft for conjoint rotation therewith and, in the other effective position, coupling said second main shaft gear to said main shaft for conjoint rotation therewith; and an additional countershaft clutch operable to couple said fifth countershaft gear with said countershaft for conjoint rotation with the latter.

8. A countershaft gear-shift transmission, as claimed in claim 7, including a spur gear fixed to that end of said hollow shaft remote from said first countershaft gear for rotation with said hollow shaft; at least one pinion rotatably mounted in said housing and constantly meshing with said spur gear; and an internal ring gear constantly meshing with said pinion; said shifting clutch means including a shifting clutch selectively operable to couple said internal ring gear with said countershaft for conjoint rotation with said countershaft.

9. A countershaft gear-shift transmission, as claimed in claim 7, in which said operating means includes a double shifting fork operable to actuate selectively said main shaft gear clutch and said countershaft gear clutch; a shifting shaft rotatably mounted in said housing and movable axially; a manual shifting lever connected to said shifting shaft; said shifting shaft being operatively connected to said double shifting fork to effect selectively engagement of either said main shaft gear clutch or said countershaft gear clutch; said manual shifting lever being movable in a shifting template having shifting slots for the respective speeds; a pair of pressure medium actuated valves; means operatively associated with said manual shifting lever and operable, responsive to movement of said manual shifting lever transversely of the speed selecting slots, to actuate one of said valves in one end position of said manual shifting lever and the other of said valves in the other end position of said shifting lever; a first fluid pressure actuator connected to said main shaft clutch to operate the latter; means connecting said valves in controlling relation with said first fluid pressure actuator; said first fluid pressure actuator including a piston rod; a second fluid pressure actuator connected to said additional countershaft clutch to operate the latter; and a valve controlling operation of said second fluid pressure actuator and controlled by said piston rod.

10. A countershaft gear-shift transmission, as claimed in claim 9, including fluid pressure actuated locking means operatively associated with said shifting shaft and operable to lock said shifting shaft against rotation in intermediate positions of said main shaft clutch and said additional countershaft clutch.